A. D. DAVIS.

TUBULAR BOILER.

No. 10,636. Reissued Aug. 18, 1885.

Witnesses
W. C. Collier
P. E. Reinemo

Inventor
Albert D. Davis
By Johnson & Kaufman
Attorneys

N. PETERS, Photo-Lithographer, Washington, D. C.

UNITED STATES PATENT OFFICE.

ALBERT D. DAVIS, OF COLORADO SPRINGS, COLORADO.

TUBULAR BOILER.

SPECIFICATION forming part of Reissued Letters Patent No. 10,636, dated August 18, 1885.

Original No 305,802, dated September 30, 1884. Application for reissue filed January 27, 1885.

*To all whom it may concern:*

Be it known that I, ALBERT D. DAVIS, a citizen of the United States, residing at Colorado Springs, in the county of El Paso and State of Colorado, have invented certain new and useful Improvements in Tubular Boilers, which are fully set forth in the following specification, reference being had to the accompanying drawings, in which—

Figure 1:
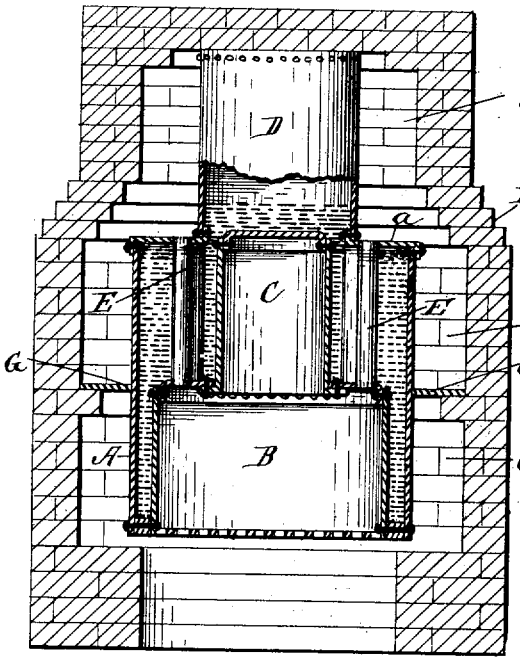
Figure 3:
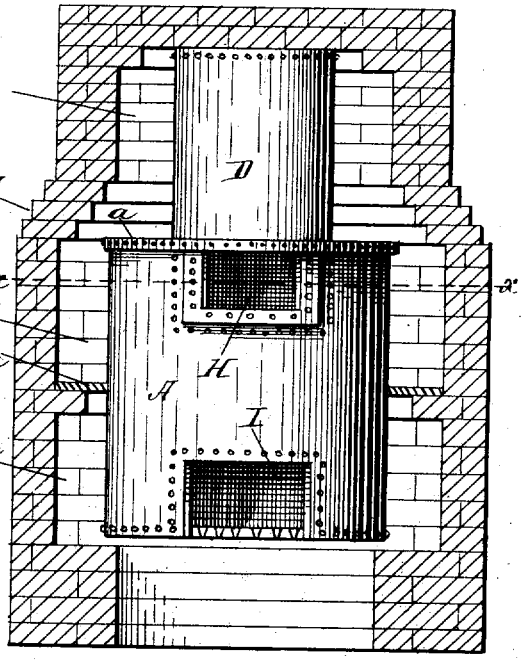
Figure 2:
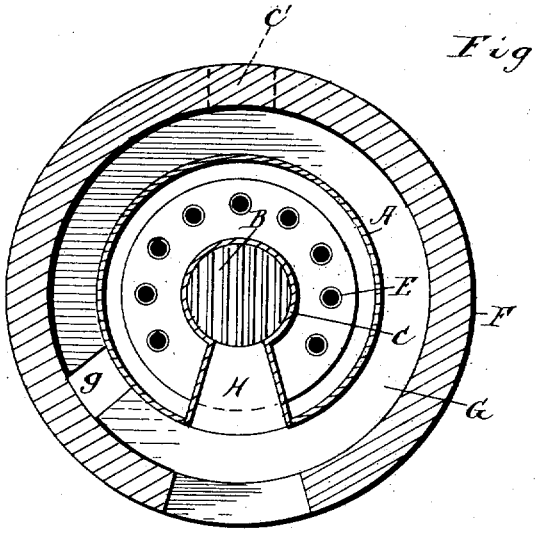

Figure 1 represents a transverse vertical section of an upright tubular boiler, in place in the furnace, embodying my invention; Fig. 2, a plan section of the same, taken on the line *x x*, Fig. 3; and Fig. 3, a front elevation of the same, the front of the furnace being removed.

My invention relates to upright tubular boilers; and it consists in the construction and arrangement of the main parts of the boiler, whereby I economize fuel, simplify the structure, and make the flues readily accessible for cleaning.

I will proceed to describe one way in which I have carried out the invention in practical form, and will then point out definitely in the claims the special improvements which I believe to be new and wish to protect by Letters Patent.

In the drawings, A represents the main body or shell of the boiler, and B the fire-box, which is arranged within this shell, being somewhat smaller than the latter. Above the fire-box is a fuel-magazine, C, which is also arranged within the shell of the boiler, and is considerably smaller than the fire-box. A steam-dome, D, surmounts the boiler, being fastened to and supported by the head *a* of the latter. This steam-dome is considerably smaller than the fire-box, but is somewhat larger than the fuel-magazine, as shown in Fig. 1 of the drawings. Tubular flues E extend from the fire-box up through the interior of the boiler to the head of the latter, in which they are inserted just outside of the base of steam-dome, so that they open around the outside of the latter. These flues should be sufficient in number to nearly surround the magazine, but should not be placed where they will interfere with the doors of the magazine and fire-box. This boiler is represented in the drawings as set in a furnace, the brick-work F of which completely surrounds it, but is arranged so as to leave space between the boiler and the interior of this casing. This space is divided horizontally by plates G G, or brick-work that can be carried over to the boiler-shell. The space *b b* above the division-plates surrounds the upper portion of the boiler and the steam-dome, while that below the plates (designated *c c*) surrounds the lower portion of the boiler. It will be noticed that the flues open into the upper space at the base of the steam-dome and just outside thereof, thereby providing communication from the fire-box to this chamber. The division-plates or brick-work partition are provided with a smoke passage or opening, *g*, thereby furnishing means for communication between the upper and lower spaces around the boiler. A door, H, is provided for the magazine, through which it may be filled with coal, and a door, I, is also provided for the fire-box. It will be noticed that the fire-box is surrounded by water, there being the so-called "water-leg" in the space between it and the shell of the boiler. It will also be noticed that the flues and magazine are also completely surrounded by water, and that the steam-dome is a straight cylinder.

The operation is as follows: The fire is of course in the fire-box B, and the hot gases pass up through the flues into the upper space, *b b*, being discharged at the base and directly at the side of the steam-dome, which being straight, they pass up along the side of the dome freely. From this upper chamber the products of combustion pass down around the boiler through the division-plates into the lower space *c c*, and thence through the opening *c'* into the chimney. It is obvious that with this construction and arrangement I obtain a large heating-surface for the production of steam, and the hot gases, being conveyed directly from the fire-box to the outer shell of the steam-dome and rising freely along the shell, will heat the steam in the dome, thereby producing a somewhat superheated steam. It is also obvious that the flues are readily accessible for cleaning through the fire-box, so that all of the soot falls outside of the boiler.

The construction and arrangement of the several parts are simple and inexpensive.

For residence-heating this construction will be found to possess great advantages. There is no danger from fire. The furnace requires little attention, and may be easily and thoroughly cleaned. The structure is a base-burner, and, owing to the great heating surface, economizes fuel.

Having thus described my invention, what I claim as new, and desire to secure by Letters Patent, is—

1. In an upright boiler, the main body or shell, in combination with a fire-box of smaller diameter and inclosed within said shell, a steam-dome above the boiler, of smaller diameter than the fire-box, a submerged fuel-magazine of smaller diameter than the steam-dome and arranged directly above the fire-box, and flues extending upward from the fire-box through the boiler, and opening into a chamber around the steam-dome, outside the circumference of the latter, substantially as and for the purposes set forth.

2. In an upright boiler, the main body or shell, in combination with a submerged fire-box of smaller diameter than the shell, a steam-dome surmounting the boiler, of smaller diameter than the fire-box, an outer wall or casing surrounding the whole, with a space or chamber between the two, and submerged flues extending from the fire-box up through the boiler, and opening into the chamber at the base of the dome and outside of its circumference, substantially as and for the purposes set forth.

3. In an upright boiler, the boiler and steam-dome, in combination with the submerged fire-box, the submerged magazine located centrally above the fire-box and beneath the steam-dome, the submerged flues leading from the top of the fire-box through the top of the boiler at the base of the steam-dome, and the chambers *b b* and *c c*, surrounding the boiler and steam-dome, substantially as and for the purposes set forth.

In testimony that I claim the foregoing as my own invention I have hereto affixed my signature in presence of two witnesses.

ALBERT D. DAVIS.

Witnesses:

JNO. THACHER,

JNO. R. GALL.